US012812399B2

(12) United States Patent
Barton et al.

(10) Patent No.: US 12,812,399 B2
(45) Date of Patent: Nov. 24, 2026

(54) OPTIMIZED DEPLOYMENT OF STAND-ALONE UWB ANCHORS

(71) Applicant: Cisco Technology, Inc., San Jose, CA (US)

(72) Inventors: Robert E. Barton, Richmond (CA); Robert C. Badea, Broadview Heights, OH (US); Fred J. Anderson, Lakeville, OH (US); Matthew A. Silverman, Shaker Heights, OH (US); Rajat K. Taneja, Twinsburg, OH (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 18/604,212

(22) Filed: Mar. 13, 2024

(65) Prior Publication Data

US 2025/0294368 A1 Sep. 18, 2025

(51) Int. Cl.
*H04W 16/18* (2009.01)
*G01S 5/02* (2010.01)
*H04W 64/00* (2009.01)

(52) U.S. Cl.
CPC .......... *H04W 16/18* (2013.01); *G01S 5/0242* (2013.01); *H04W 64/00* (2013.01)

(58) Field of Classification Search
CPC ..... H04W 16/00; H04W 16/02; H04W 16/10; H04W 16/12; H04W 16/18; H04W 16/20; H04W 16/24; H04W 64/00; G01S 5/0242
See application file for complete search history.

(56) References Cited

U.S. PATENT DOCUMENTS 10,064,012 B1 8/2018 Boston et al.
2022/0070816 A1* 3/2022 Henry ....................... G01S 5/14
2022/0137176 A1 5/2022 Silverman et al.
2022/0191814 A1* 6/2022 Silverman ............ H04W 24/08
2022/0386266 A1* 12/2022 Henry .................. H04W 64/00
2024/0236921 A1* 7/2024 Hunukumbure ...... H04W 4/023
2025/0081156 A1* 3/2025 Shin ..................... H04W 64/00

FOREIGN PATENT DOCUMENTS

WO 2022235001 A1 11/2022
WO 2023167858 A1 9/2023

OTHER PUBLICATIONS

IEEE: "P802.15.4z™ /D07 Draft Standard for Low-Rate Wireless Networks Amendment: Enhanced Ultra Wideband (UWB) Physical Layers (PHYs) and Associated Ranging Techniques", IEEE Computer Society, Mar. 2020, pp. 1-185.

* cited by examiner

*Primary Examiner* — Siu M Lee
(74) *Attorney, Agent, or Firm* — Patterson + Sheridan, LLP

(57) ABSTRACT

Disclosed herein is a software tool designed to add and place stand-alone UWB anchors to provide a minimum of UWB anchors for accurate UWB ranging. The tool divides an area in which access points are situated into a number of cells and evaluates each cell for coverage. If a cell does not have a minimum number of UWB anchors for accurate UWB ranging, the tool determines that a coverage hole is present. The tool then adds stand-alone UWB anchors to the area to eliminate the coverage holes. The tool adds stand-alone UWB anchors in a number of iterations and selects the iteration with the minimum number of stand-alone UWB anchors that eliminate the coverage holes.

20 Claims, 9 Drawing Sheets

OPTIMIZED DEPLOYMENT OF STAND-ALONE UWB ANCHORS

TECHNICAL FIELD

Embodiments presented in this disclosure generally relate to Ultra-wideband (UWB) networks. More specifically, embodiments disclosed herein relate to placing anchors among access points to improve coverage area.

BACKGROUND

Ultra-wideband (UWB) networks are similar to other broadcast networking protocols in that UWB has physical (PHY), media access control (MAC), and application layers. IEEE standard 802.15.4z specifies the PHY layer, the MAC layer, and sublayers for ad hoc connectivity with fixed devices (anchors), portable devices, and moving devices with limited energy consumption requirements and supports real-time precision ranging capability that is accurate to within a few centimeters. Precision ranging depends on there being an adequate number of UWB devices in an area. When UWB functionality is incorporated in access points, the access points alone seldom provide adequate coverage for precision ranging.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
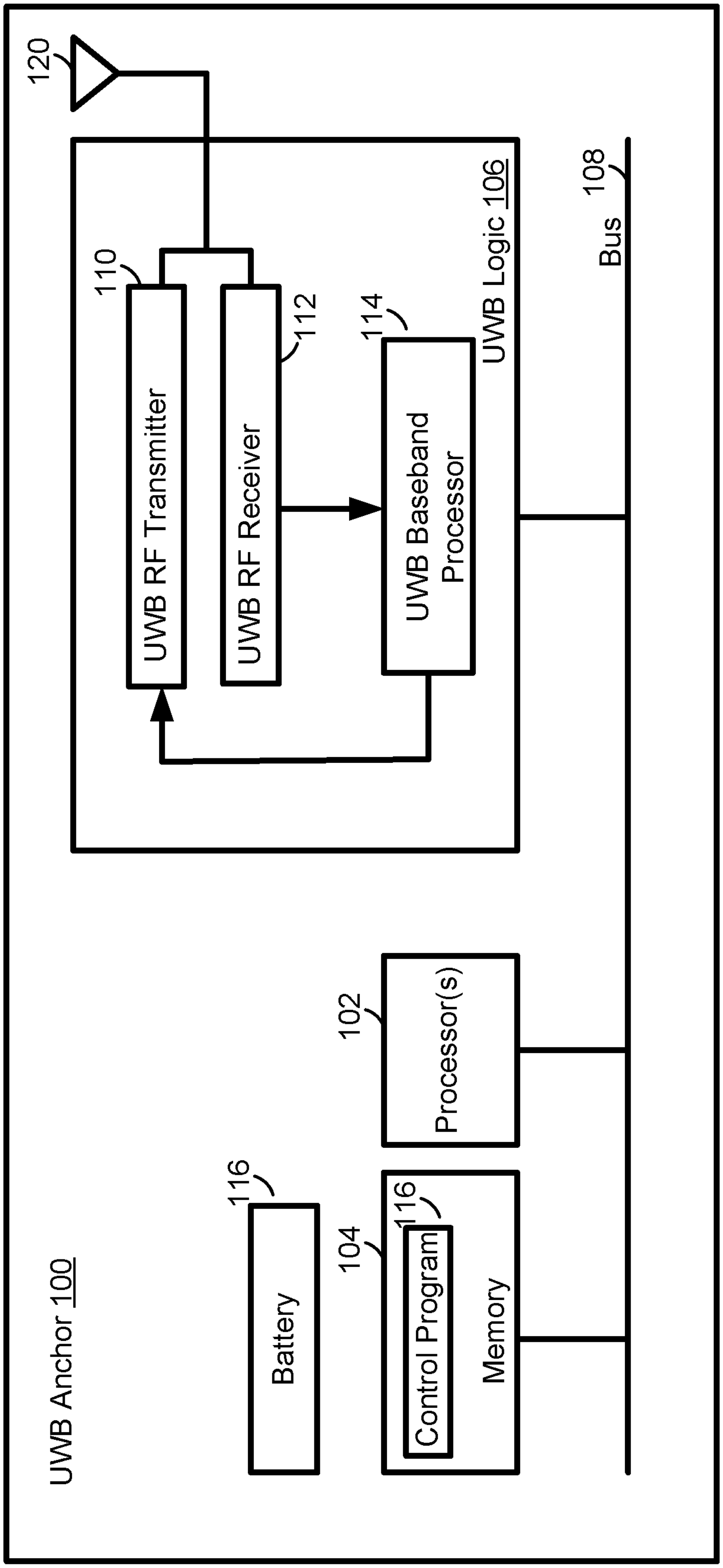
FIG. 1A is a block diagram of a UWB anchor device.

One embodiment presented in this disclosure is a method of placing stand-alone ultra-wideband (UWB) anchors (SAAs). The method includes dividing a representation of an area on which a plurality of access points (APs) is situated to form a plurality of cells, the plurality of access points operating as UWB anchors, determining in the representation whether each cell of the plurality of cells has access to a minimum number of UWB anchors for accurate UWB ranging. The method further includes, when any cell in the plurality of cells lacks the minimum number of UWB anchors for accurate UWB ranging, determining in the representation that a coverage hole is present; and adding in the representation a number of SAAs to positions on the area to eliminate the coverage holes while minimizing the added number of SAAs.

Another embodiment presented in this disclosure is a computer system that includes a processor; and a memory coupled to the processor and having loaded therein a tool. The tool is configured to: divide a representation of an area on which a plurality of access points is situated into a plurality of cells; examine each of the plurality of cells to determine in the representation whether each cell has a minimum number of UWB anchors for accurate ranging considering only the plurality of access points; and add in the representation a number of SAAs to the area until each cell has the minimum number of UWB anchors for accurate UWB ranging, and the added number of SAAs is a minimum number.

Yet another embodiment presented in this disclosure is a non-transitory computer-readable medium encoding instructions of a software tool, which, when executed by a processor of a computer system, cause the software tool to: divide a representation of an area on which a plurality of access points is situated into a plurality of cells; examine each of the plurality of cells to determine in the representation whether each cell has a minimum number of UWB anchors for accurate ranging considering only the plurality of access points; and add in the representation a number of SAAs to the area until each cell has the minimum number of SAAs for accurate UWB ranging, and the added number of SAAs is a minimum number.

Example Embodiments

In UWB networks, ranging is the action of computing the distance of a target node from a reference node. A reference node wanting to establish ranging information regarding a target node in the UWB network can acquire this information by establishing a peer-to-peer communication link with the target node. This communication link is used to evaluate parameter values that are used at the reference node to estimate its distance from the target node. A time of arrival (TOA) technique computes the distance based on the estimated propagation delay between a transmitter and a receiver.

In performing UWB ranging, a minimum number of UWB anchors is needed to ensure accurate ranging. A minimum of three to four UWB anchors is needed in a two-dimensional area. When anchors are implemented in access points (APs) of a Wi-Fi infrastructure, there may be too few APs in an area to meet that minimum number of anchors because the UWB radio range is typically much less than the Wi-Fi range in most non-line-of-sign (NLOS)

scenarios, leading to coverage holes. Walls and other obstacles can also limit the range of UWB, where line-of-sight (LOS) is reduced from hundreds of meters to sometimes just tens of meters.

Thus, the APs need to be supplemented with UWB anchors, such as SAAs, to improve coverage over the area. Many different placements of SAAs are possible in a given area, so it is desirable to add and place only the minimum number of SAAs to meet the minimum number for ranging between UWB devices.

FIG. 1A is a block diagram of a UWB anchor device 100. The UWB anchor device 100 can be, for example, an SAA device or a peripheral UWB anchor device (part of another device, such as an access point (AP). The UWB anchor device 100 includes bus 108, which interconnects UWB logic 106, one or more processors 102, and a memory 104. UWB logic 106 includes a UWB RF transmitter 110, a UWB RF receiver 112, and a UWB baseband processor 114. The processor(s) 102 can be microprocessor(s) and/or microcontroller(s). The memory stores a control program 116 for operating the MAC and PHY layers of the UWB anchor.

Figure 1B:
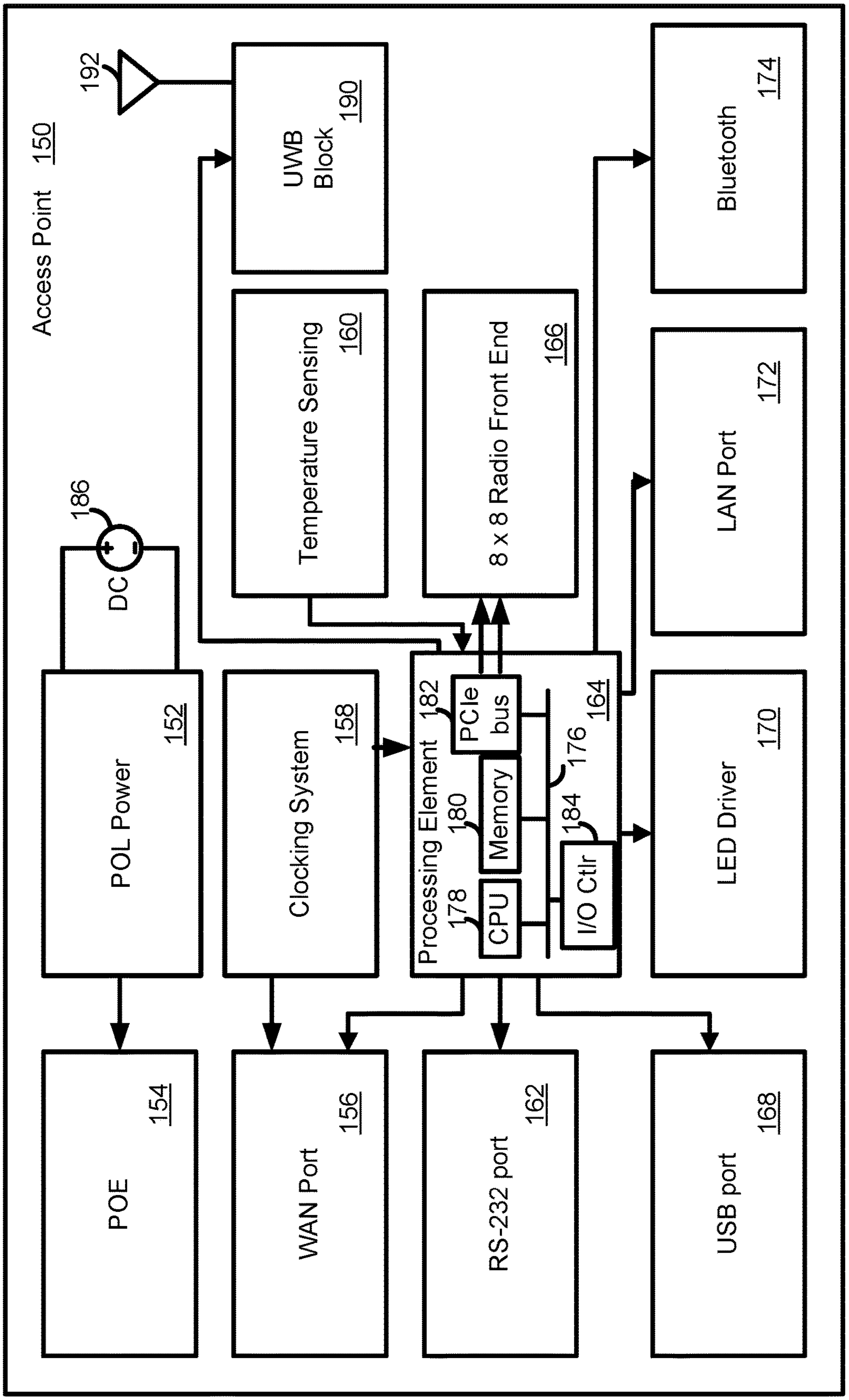
FIG. 1B is a block diagram of an access point (AP) with a UWB block.

FIG. 1B is a block diagram of an AP with a UWB block. The AP 150 includes a processing element 164 and several ports or connection facilities, such as a WAN port 156, USB port 168, RS-232 port 162, LAN port 172, and Bluetooth 174. Also included are a clocking system 158 and an 8×8 radio front-end 166 with a transmitter and receiver, which are coupled to eight external antennas. Auxiliary modules include a temperature sensing module 160, a power module 152 connected to a DC power source 186, a power over Ethernet (POE) module 154, LED driver 170, and a UWB antenna 192 coupled to UWB block 190, which is similar to UWB anchor device 100. Processing element 164 includes a CPU 178 and memory 180, a peripheral control interconnect express (PCIe) bus controller 182 for connecting to the 8×8 radio front-end 166, and an I/O controller 184, all coupled to each other via bus 176.

Figure 2:
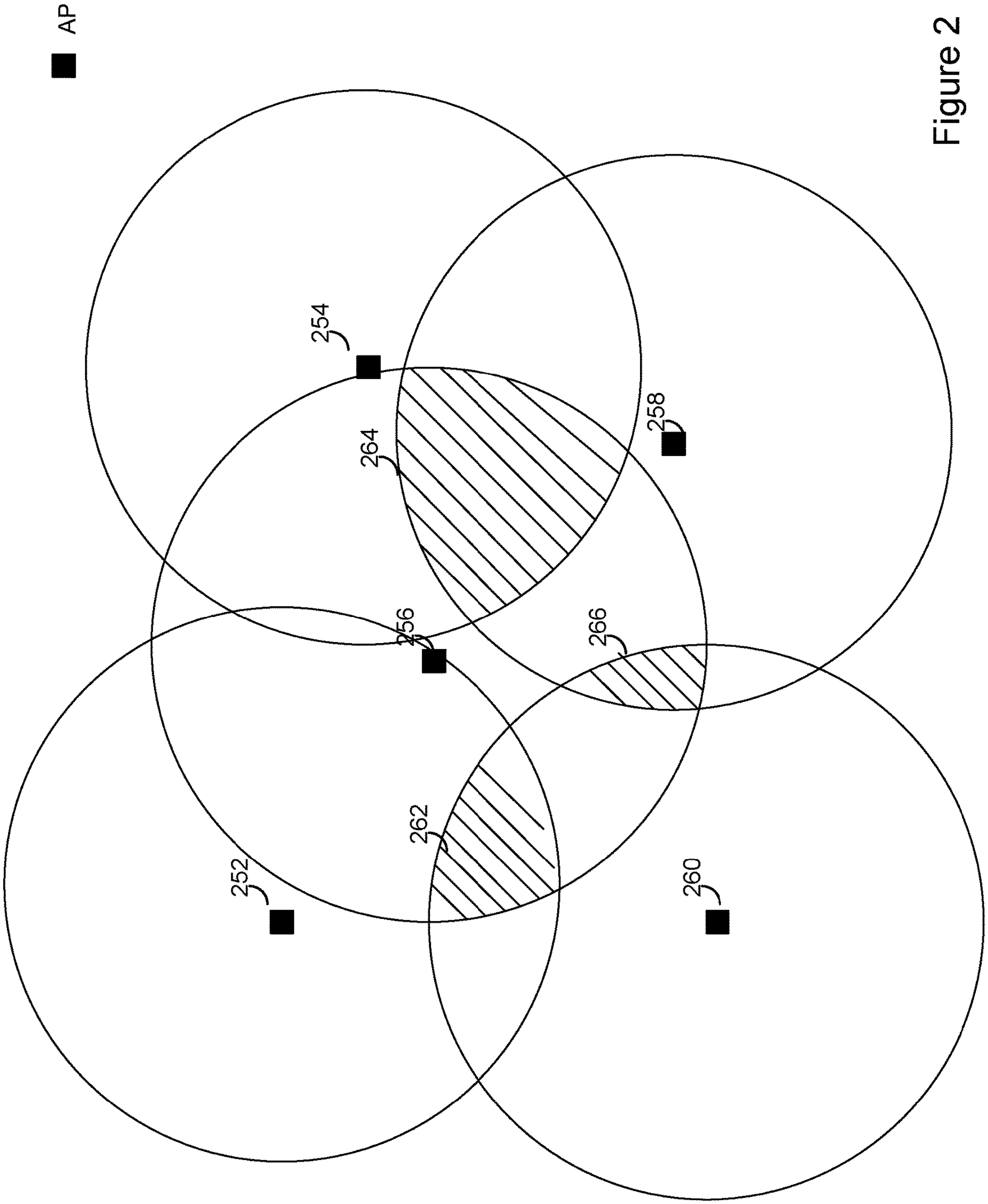
FIG. 2 depicts a representation of an arrangement of access points over an area.

FIG. 2 depicts a representation of an arrangement of access points on a floor. The current position of five access points, 252, 254, 256, 258, 260, is shown along with their areas of coverage. Areas 262, 264, 266 have adequate coverage, i.e., coverage by at least three access points. For example, area 262 is covered by access points 256, 252, and 260. However, the other non-shaded areas are not adequately covered for UWB ranging, i.e., covered by only two access points with UWB capability.

Figure 3:
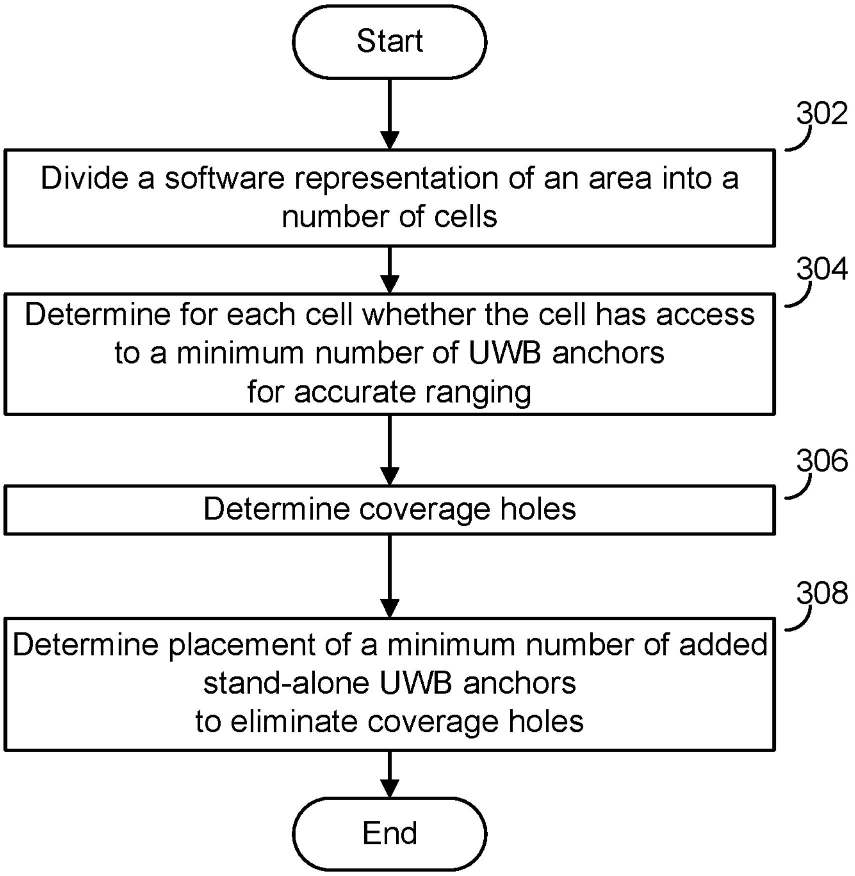
FIG. 3 depicts a flow of operations for a software tool to find a minimum number of added stand-alone anchors (SAAs) for accurate ranging, in an embodiment.

FIG. 3 depicts a flow of operations for a software tool to find a minimum number of added SAAs for accurate ranging, in an embodiment. In block 302, the tool divides a representation of an area where access points are situated into a plurality of cells. In block 304, the tool determines whether each cell has access to a minimum number of UWB anchors for accurate ranging. In some embodiments, the minimum number is four. In block 306, the tool determines the coverage holes based on information from block 304. In block 308, the tool determines the placement of a minimum number of added stand-alone UWB anchors to eliminate the coverage holes. Blocks 302-308 are described in more detail in reference to FIGS. 4A-4D, respectively.

Figure 4A:
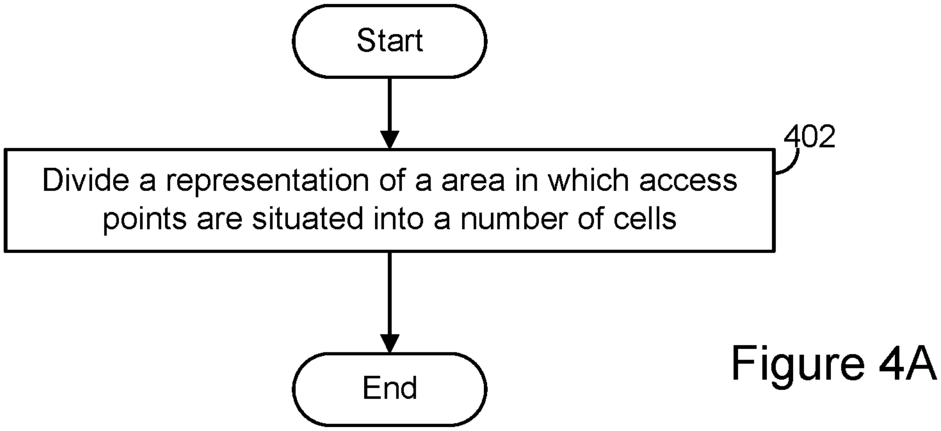
FIG. 4A depicts a flow chart for the software tool to divide the area into cells, in an embodiment.

FIG. 4A depicts a flow chart for the software tool to divide the area into cells, in an embodiment. In the figure, block 402 divides a software representation of an area in which the access points are situated into a number of cells (say rectangular or circular). The number of cells depends on the typical distance over which ranging occurs among the UWB anchors. A large number of small cells provides more resolution for the coverage determination of each cell.

Figure 4B:
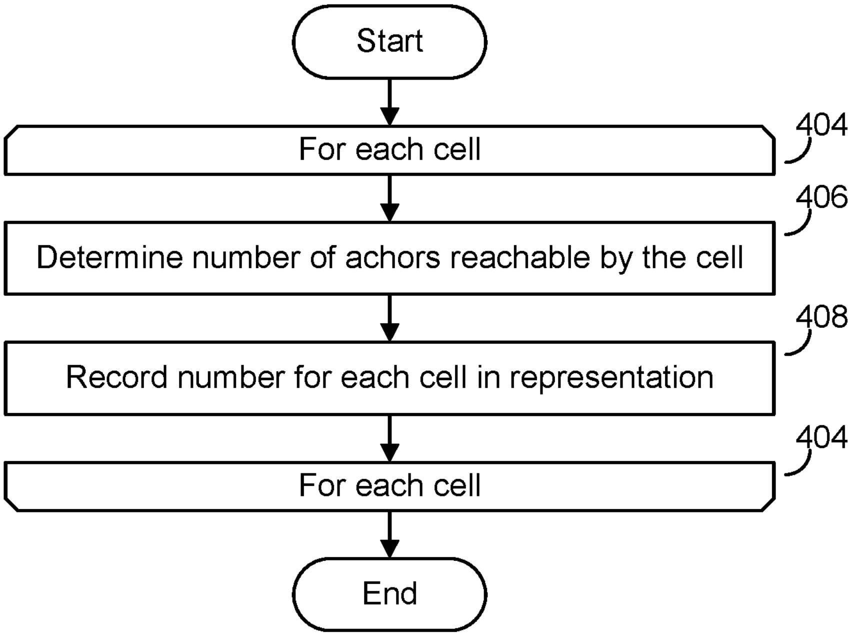
FIG. 4B depicts a flow of operations for a software tool to determine the number of anchors reachable by a cell, in an embodiment.

FIG. 4B depicts a flow of operations for a software tool to determine the number of anchors reachable by a cell, in an embodiment. With the area divided into a number of cells, the tool in FIG. 4B examines the cells in block 404 to determine the number of anchors reachable by the cell in block 406. An "ant path" or Newton descent technique can be used to optimize the examination path. The number of anchors reachable by a cell is based on the current position of the anchors, the transmit power levels, distances between anchors, obstacle characteristics (optionally), and reported measurements (optionally). In block 408, the tool records the number for each cell in the representation.

Figure 4C:
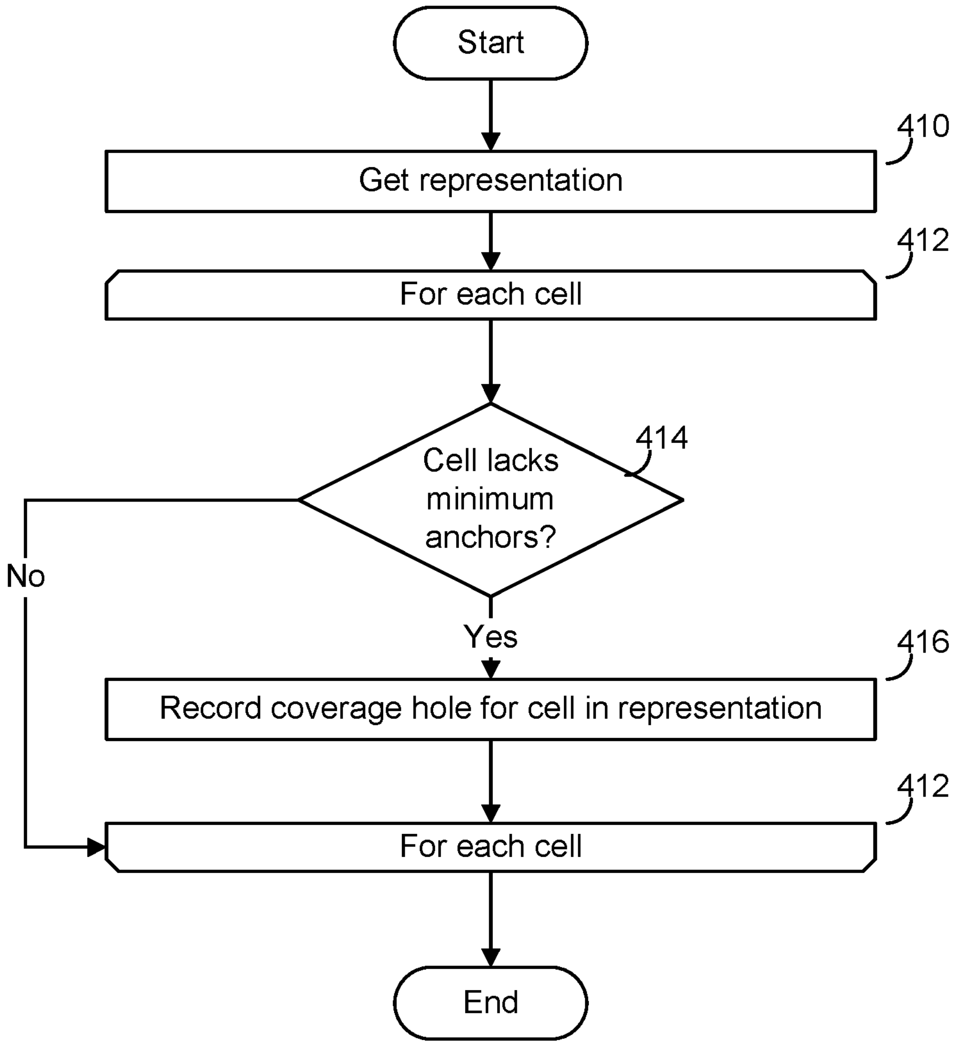
FIG. 4C depicts a flow of operations for a software tool to determine whether a cell lacks a minimum number of anchors for accurate ranging, in an embodiment.

FIG. 4C depicts a flow of operations for a software tool to determine whether a cell lacks a minimum number of anchors for accurate ranging, in an embodiment. In block 410, the tool gets the representation, which contains the number of anchors reachable for each cell, as determined in FIG. 4B. The tool then looks at each cell in block 412 and determines in block 414 whether the number of anchors reachable is less than the minimum. If so, the tool then records in the representation that the cell has a coverage hole in block 416. If not (i.e., the cell reaches a minimum number of anchors), the tool continues to iterate until it has evaluated all the cells.

Figure 4D:
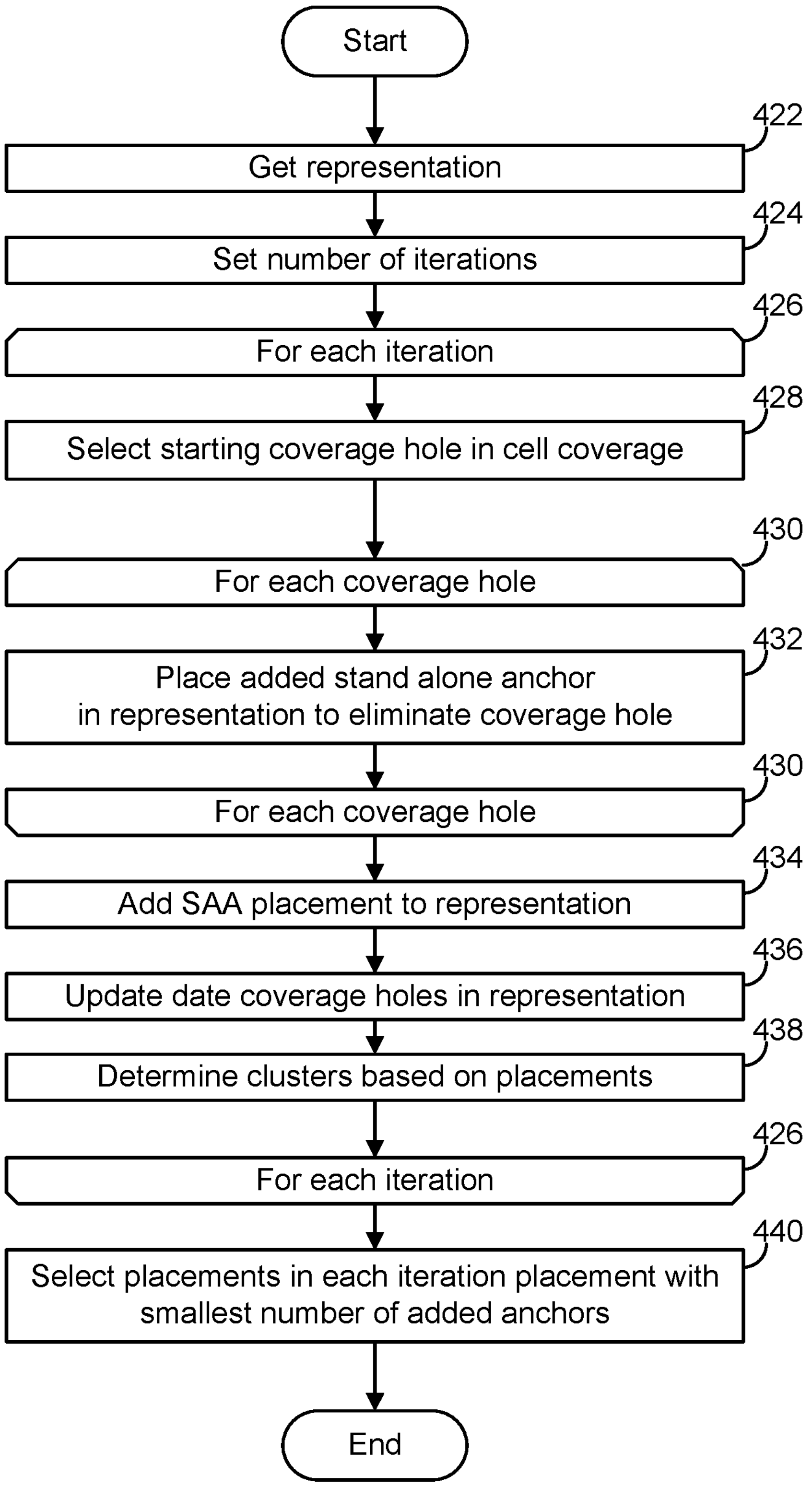
FIG. 4D depicts a flow of operations for a software tool to determine a minimum number of SAAs to add to the area for accurate ranging, in an embodiment.

FIG. 4D depicts a flow of operations for a software tool to determine a minimum number of SAAs to add to the area for accurate ranging, in an embodiment. In block 422, the tool obtains the representation, which contains a record of the coverage holes. In block 424, the tool sets a value for a number of iterations. The tool then randomly selects a starting coverage hole in block 428 for an iteration (block 426) over the coverage holes recorded in the representation. For each coverage hole in the current iteration (block 430), the tool adds and places an SAA that would eliminate the coverage hole, in block 432. In block 434, the tool adds the SAA placement to the representation. In block 436, the tool updates the coverage holes in the representation, as the placement of an SAA may eliminate other coverage holes besides the one in the iteration. In block 438, the tool groups the placed SAAs into clusters. After the iterations are complete, the tool examines in block 440 the placements of each iteration to find the smallest number of added SAAs and the smallest number of clusters.

Alternatively, the tool may perform a few SAA placements to obtain data points to which a function F can be fit. Function F has the number of SAAs and clusters as its arguments. Finding the number of SAAs and clusters that minimize the value of the function gives the smallest number of added SAAs and the smallest number of clusters needed to eliminate the coverage holes.

Figure 5:
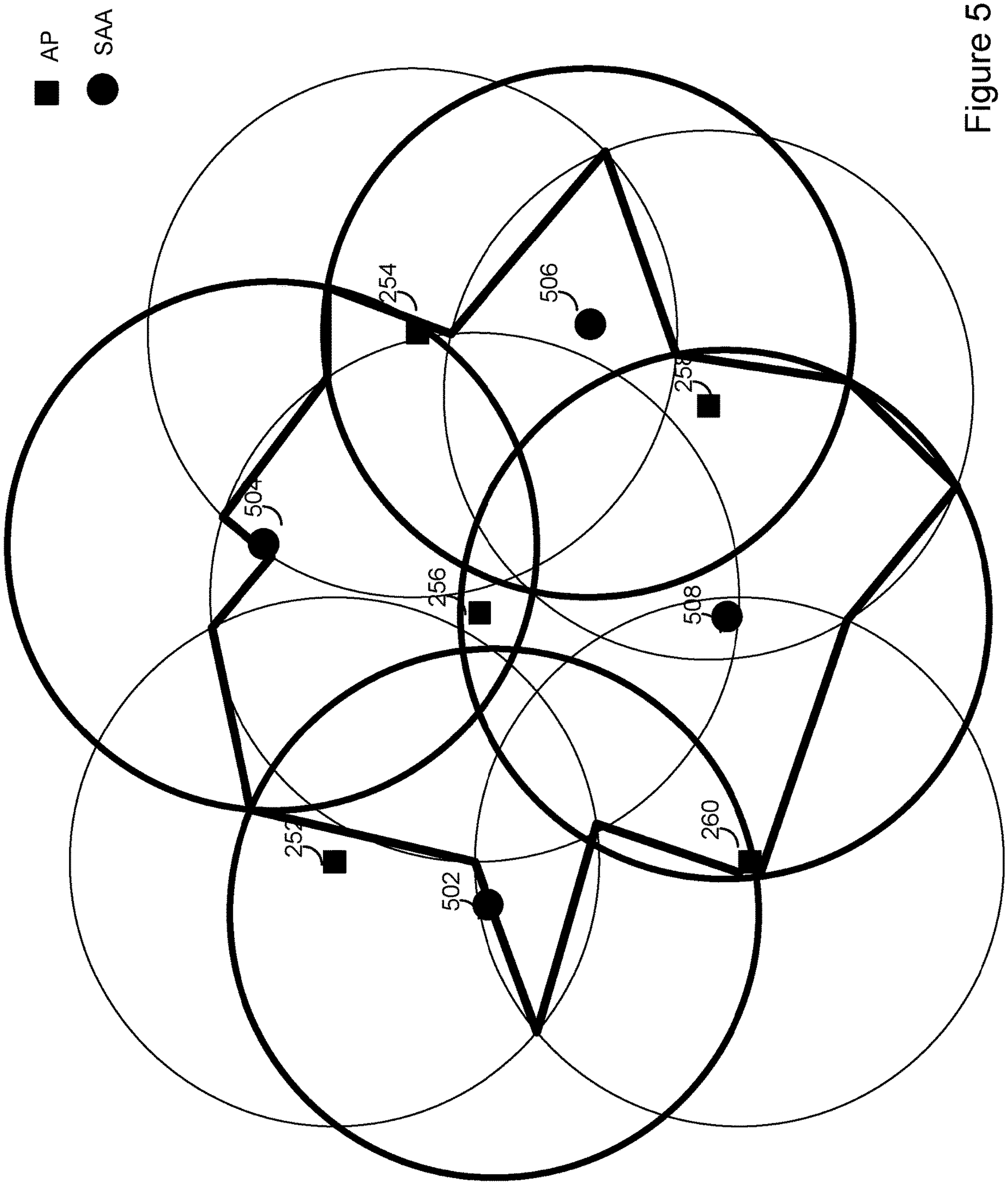
FIG. 5 depicts a representation of an arrangement of anchors and access points, according to an embodiment.

FIG. 5 depicts a representation of an arrangement of anchors and access points, according to an embodiment. In the representation resulting from carrying out the flow of operation of FIGS. 3 and 4, four SAAs, 502, 504, 506, 508, are added to the existing arrangement of APs 252, 254, 256, 258, 260 depicted in FIG. 2. The additional SAAs, with their coverage areas, give adequate coverage to a larger area. The flow of operation of FIGS. 3 and 4 may result in a placement of SAAs different from that depicted, depending on the positioning of the first added SAA.

Figure 6:
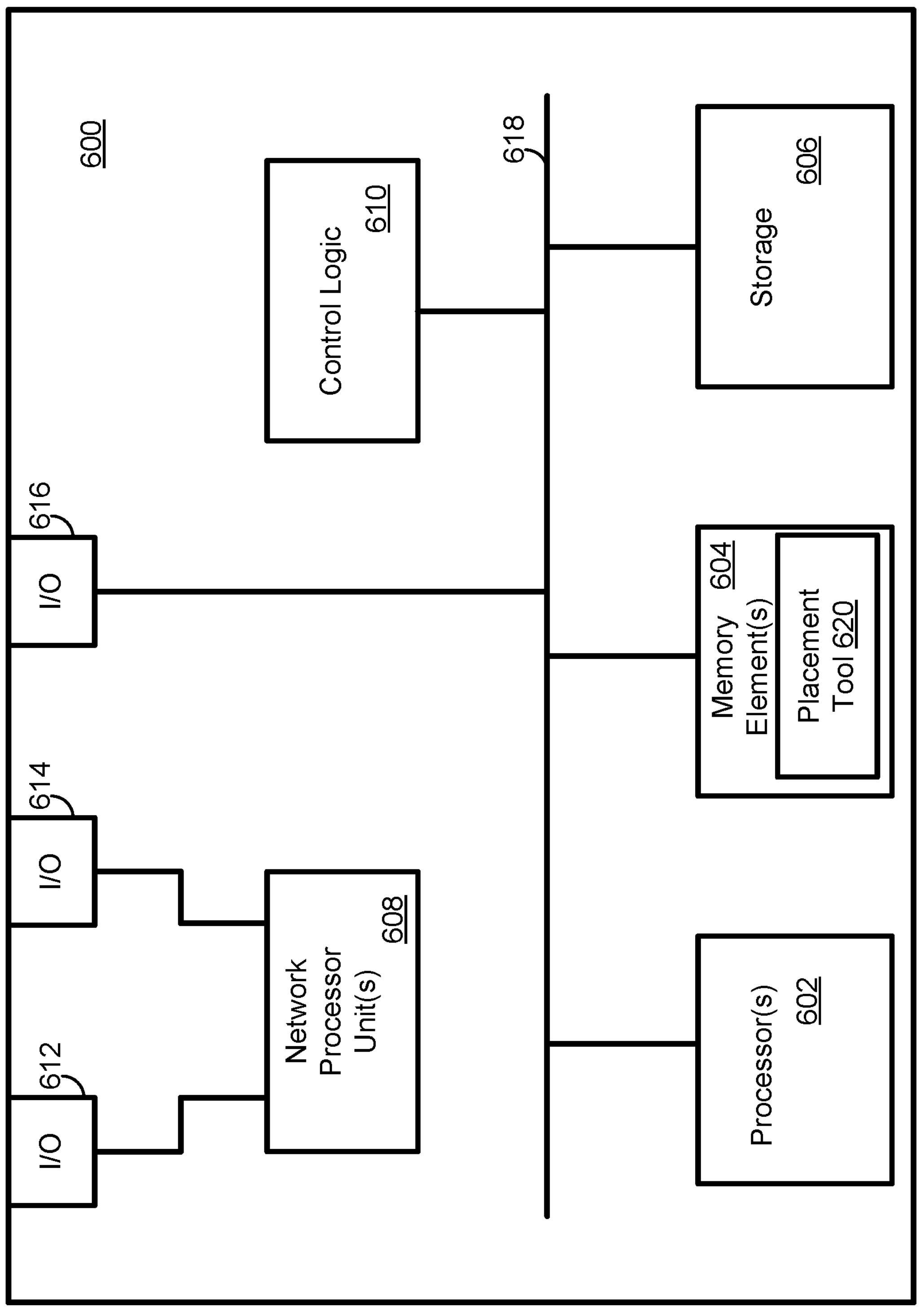
FIG. 6 is a block diagram of a computing device configured to perform operations associated with embodiments described herein, according to an example embodiment.

FIG. 6 is a block diagram of a computing device configured to perform operations associated with embodiments described herein, according to an example embodiment. The computing device 600 may perform functions associated with operations discussed herein in connection with the techniques depicted in FIGS. 3 and 4.

In one embodiment, the computing device 600 includes one or more processor(s) 602, one or more memory element(s) 604, storage 606, a bus 618, one or more network processor unit(s) 608 interconnected with one or more network input/output (I/O) interface(s) 612, 614, one or more I/O interface(s) 616, and control logic 610. In various embodiments, instructions associated with logic for computing device 600 can overlap in any manner and are not limited to the specific allocation of instructions and/or operations described herein.

In one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any potential processing elements, microprocessors, digital signal processors, baseband signal processors, modems, controllers, systems, managers, logic, and/or machines described herein can be construed as encompassed within the broad term 'processor.'

In one embodiment, memory element(s) 604 and/or storage 606 is/are configured to store data, information, software including placement tool 620 described in FIGS. 3 and 4A-4D, and/or instructions associated with computing device 600, and/or logic configured for memory element(s) 604 and/or storage 606. For example, any logic described herein (e.g., control logic 610) can, in various embodiments, be stored for computing device 600 using any combination of memory element(s) 604 and/or storage 606. Note that in some embodiments, storage 606 can be consolidated with memory element(s) 604 (or vice versa) or overlap/exist in any other suitable manner.

In one embodiment, bus 618 can be configured as an interface that enables one or more elements of computing device 600 to communicate in order to exchange information and/or data. Bus 618 can be implemented with any architecture designed for passing control, data, and/or information between processors, memory elements/storage, peripheral devices, and/or any other hardware and/or software components that may be configured for computing device 600. In one embodiment, bus 618 may be implemented as a fast kernel-hosted interconnect, potentially using shared memory between processes (e.g., logic), which can enable efficient communication paths between the processes.

In various embodiments, network processor unit(s) 608 enables communication between computing device 600 and other systems, entities, etc., via network I/O interface(s) 612, 614 to facilitate operations discussed for various embodiments described herein. In various embodiments, network processor unit(s) 608 are configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 614 are configured as one or more Ethernet port(s), Fibre Channel ports, and/or any other I/O port(s) now known or hereafter developed. Thus, the network processor unit(s) 608 and/or network I/O interface(s) 612 614 include suitable interfaces for receiving, transmitting, and/or otherwise communicating data and/or information in a network environment.

I/O interface(s) 616 allow for input and output of data and/or information with other entities that may be connected to computer device 600. For example, I/O interface(s) 616 provides a connection to external devices such as a keyboard, keypad, touch screen, and/or any other suitable input and/or output device now known or hereafter developed. In some instances, external devices can also include portable computer-readable (non-transitory) storage media such as database systems, thumb drives, portable optical or magnetic disks, and memory cards. In some instances, external devices can be a mechanism to display data to a user, such as, for example, a computer monitor, a display screen, or the like.

In various embodiments, control logic 610 includes instructions that, when executed, cause processor(s) 602 to perform operations, which can include, but not be limited to, providing overall control operations of a computing device; interacting with other entities, systems, etc. described herein; maintaining and/or interacting with store data, information, parameters, etc. (e.g., memory element(s), storage, data structures, databases, tables, etc.); combinations thereof; and/or the like to facilitate various operations for embodiments described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of placing stand-alone ultra-wideband (UWB) anchors, the method comprising:

dividing a representation of an area in which a plurality of access points (APs) is situated to form a plurality of cells, the plurality of access points operating as UWB anchors;

determining in the representation whether each cell of the plurality of cells has access to a minimum number of UWB anchors for accurate UWB ranging;

when any cell in the plurality of cells lacks the minimum number of UWB anchors accessible for accurate UWB ranging, determining in the representation that a coverage hole is present; and adding in the representation a number of stand-alone UWB anchors to positions in the area to eliminate the coverage hole while minimizing the number of stand-alone UWB anchors that are added.

2. The method of claim 1, wherein the minimum number of UWB anchors for accurate UWB ranging is four anchors.

3. The method of claim 1, wherein a number of clusters containing the UWB anchors is minimized.

4. The method of claim 1, wherein an objective function specifies the minimum number of UWB anchors for accurate UWB ranging and a minimum number of clusters.

5. The method of claim 1, wherein a number of UWB anchors accessible by one of the plurality of cells is determined by a current position of the UWB anchors, transmit-power levels, and distances between the UWB anchors.

6. The method of claim 1, wherein Newton descent is used to determine whether the cell has access to the minimum number of UWB anchors for accurate UWB ranging.

7. The method of claim 1, wherein determining that the coverage hole is present relies on using the minimum number of UWB anchors as an objective function.

8. A computer system comprising:

a processor; and a memory coupled to the processor and having loaded therein a tool, wherein the tool is configured to:

divide a representation of an area in which a plurality of access points is situated into a plurality of cells;

examine each of the plurality of cells to determine in the representation whether each cell has a minimum number of UWB anchors accessible for accurate ranging considering only the plurality of access points; and add in the representation a number of stand-alone UWB anchors to the area until each cell has the minimum number of UWB anchors for accurate UWB ranging, and the number of stand-alone UWB anchors added is a minimum number.

9. The computer system of claim 8, wherein the minimum number of UWB anchors for accurate UWB ranging is four anchors.

10. The computer system of claim 8, wherein a number of clusters containing the UWB anchors is minimized.

11. The computer system of claim 8, wherein an objective function specifies the minimum number of UWB anchors for accurate UWB ranging and a minimum number of clusters.

12. The computer system of claim 8, wherein a number of UWB anchors accessible by one of the plurality of cells is determined by a current position of the UWB anchors, transmit-power levels, and distances between the UWB anchors.

13. The computer system of claim 8, wherein Newton descent is used to determine whether the cell has access to the minimum number of UWB anchors for accurate UWB ranging.

14. The computer system of claim 8, wherein the tool is configured to determine that a coverage hole is present using the minimum number of UWB anchors as an objective function.

15. A non-transitory computer-readable medium encoding instructions of a software tool, which, when executed by a processor of a computer system, cause the software tool to:

divide a representation of an area in which a plurality of access points is situated into a plurality of cells;

examine each of the plurality of cells to determine in the representation whether each cell has a minimum number of UWB anchors accessible for accurate ranging considering only the plurality of access points; and add in the representation a number of stand-alone UWB anchors to the area until each cell has the minimum number of UWB anchors for accurate UWB ranging, and the number of stand-alone UWB anchors added is a minimum number.

16. The non-transitory computer-readable medium of claim 15, wherein a number of clusters containing the UWB anchors is minimized.

17. The non-transitory computer-readable medium of claim 15, wherein an objective function specifies the minimum number of UWB anchors for accurate UWB ranging and a minimum number of clusters.

18. The non-transitory computer-readable medium of claim 15, wherein a number of UWB anchors accessible by one of the plurality of cells is determined by a current position of the UWB anchors, transmit-power levels, and distances between the UWB anchors.

19. The non-transitory computer-readable medium of claim 15, wherein Newton descent is used to determine whether the cell has access to the minimum number of UWB anchors for accurate UWB ranging.

20. The non-transitory computer-readable medium of claim 15, wherein the instructions cause the software tool to determine that a coverage hole is present using the minimum number of UWB anchors as an objective function.

* * * * *